United States Patent Office 3,511,799
Patented May 12, 1970

3,511,799
STABLE AQUEOUS DISPERSIONS OF ETHYLENE POLYMERS
Bert H. Clampitt, Overland Park, Kans., assignor to Gulf Research & Development Company, Pittsburgh, Pa., a corporation of Delaware
No Drawing. Continuation of application Ser. No. 585,283. Oct. 10, 1966. This application June 20, 1969, Ser. No. 835,231
Int. Cl. C08f 27/00
U.S. Cl. 260—29.6      6 Claims

ABSTRACT OF THE DISCLOSURE

Stable aqueous dispersions of water-insoluble, self-emulsifiable ethylene-alkyl acrylate polymers substantially free of metallic cations are obtained by contacting aqueous dispersions of water-insoluble, self-emulsifiable ethylene-alkyl acrylate polymers containing metallic cations with a strongly acidic cation exchange resin charged with ammonium ions.

---

CROSS REFERENCE TO RELATED APPLICATIONS

This application is a continuation of application Ser. No. 585,283, filed Oct. 10, 1966.

This invention relates to stable ethylene polymer dispersions and to a process for preparing such stable aqueous dispersions. In another aspect, this invention relates to stable aqueous dispersions of water-insoluble self-mulsifiable ethylene-alkyl acrylate polymers substantially free of metallic cations.

The application of stable polymeric emulsions to fabricating materials, such as paper, woven fabrics, wood, metal and glass, and the like, has grown to a wide usage. It has been observed that conventional polymeric films can also be improved in deficient properties by the application of a stable polymeric emulsion, resulting in improved properties such as water impermeability. It is contemplated that even greater usage will be made of economical polymeric emulsions which are readily reproducible and which have improved stability and other desired characteristics. The particularly desired polymeric emulsions are those which do not require the addition of the emulsifying agents, either during polymerization or by post addition. These emulsifying agents, conventionally required in polymeric emulsions, detract from the desirable properties of the emulsified polymeric material by, for example, reducing tensile strength, reducing freeze-thaw stability, and reducing stability to high heat conditions, and the like.

Copending application Ser. No. 131,108 by Jack Hurst and Harry D. Anspon, filed Aug. 14, 1961, describes the preparation of water-insoluble, self-emulsifiable ethylene-alkyl acrylate interpolymers by the hydrolysis of at least a portion of the acrylate groups of an ethylene-alkyl acrylate interpolymer by employing an alkali hydroxide and, optionally, a nitrogenous base. The product of the hydrolysis reaction is an ethylene-alkyl acrylate interpolymer wherein a self-emulsifiable portion of the acrylate groups are in hydrophilic form. A stable aqueous dispersion product of the hydrolysis process described in copending application Ser. No. 131,108 contains at least a portion of the acrylate groups of the product interpolymer in carboxylate salt form. In many applications, for example, where the aqueous polymeric dispersion to be employed in certain coating processes, it is desirable that the metallic ions be removed from the dispersion without reducing the stability of the dispersion.

Accordingly, an object of the invention is to provide a stable aqueous dispersion of a self-emulsifiable ethylene-alkyl acrylate polymer substantially free of metallic ions.

Another object of the invention is to provide a process for preparing a stable aqueous dispersion of a self-emulsifiable ethylene-alkyl acrylate polymer substantially free of metallic ions.

Other objects, advantages and features of this invention will be readily apparent to those skilled in the art from the following description and appended claims.

By the invention, aqueous dispersions of self-emulsifiable, water-insoluble ethylene-alkyl acrylate polymers containing 0.01 to about 0.5 mol of acrylate groups per mol of contained ethylene groups and wherein at least a poriton of the acrylate groups is in carboxylate salt form, are contacted with an ion exchange medium comprising a strongly acidic cation exchange resin charged with ammonium ions. The ammonium ions are exchanged for the metallic cations of the aqueous dispersion substantially free of metallic cations is recovered from the ion exchange zone. Optionally, the portion of the acrylate groups of the self-emulsifiable, ethylene-alkyl acrylate polymer can be in amide and/or acid form.

The ammonium salt produced by the exchange of the ammonium ion for the metallic ion rapidly decomposes to form the carboxylic acid group. Although not normally required, the decomposition of the ammonium salt is accelerated by the addition of heat. Thus, the product of the ion exchange process is a stable aqueous dispersion of a self-emulsifiable ethylene-alkyl acrylate polymer substantially free of metallic ions and wherein at least a portion of the acrylate groups are in acid form.

"Ethylene groups" and "acrylate groups" as used herein are defined as those units of the polymer which correspond to the ethylene-acrylate monomers, respectively, which are polymerized in forming the polymer. "Water-insoluble" as used herein refers to the inability of the fused solid ethylene-alkyl acrylate polymer to become substantially dissolved in water as measured, for example, by preparing a ½ mil cast film of the product polymer by conventional methods, placing a 10 x 10 centimeter sample in one liter of water maintained at a temperature of 30° for period of 24 hours, removing the film from the water, drying the film to a constant weight at 120° C. and determining that the weight loss in the film when compared to the weight of the original film sample shall be less than 10 weight percent. "Self-emulsifiable" as used herein refers to that property of the polymer whereby one gram of the polymer in particulate form can be readily dispersed in 100 ml. of water in a stirred metal autoclave maintained at a temperature in the range of 180 to 300° C. to provide, in the absence of an emulsifying agent, a shelf-stable dispersion wherein the average particle size is less than two microns.

"Shelf-stable" as applied to the aqueous dispersions of this invention describe aqueous dispersions which give no appearance of significant change after 48 hours standing and customarily even after 30 days storage in conventional glass containers at ambient room temperatures. The aqueous dispersion compositions produced by the process of this invention show unusual stability to temperature exchange, vis, that of stability to relatively low and high temperatures, such as ordinary boiling water temperature or higher. The novel aqueous dispersion compositions of this invention further exhibit a high degree of mechanical stability as measured, for example, by exposure to agitation in a Waring blendor for at least one minute at its common rotation speed of about 17,000 r.p.m.

The ion exchange medium employed in preparation of the stable aqueous dispersions of this invention comprises a strongly acidic cation exchange resin charged h ammonium ions. Suitable strongly acidic exchange ns include conventional sulfonated polystyrene resins h as the resins manufactured and distributed by Dow :mical Company under the trade name of Dowex-50. : ion exchange medium can be prepared by contacting strongly acidic cation exchange resin with an aqueous ition, preferably saturated, of an inorganic or organic monium salt. Saturated ammmonium chloride solu- is have been found to be particularly effective in rging the strongly acidic base resin with ammonium s.

.eference is made to copending application entitled n Exchange Process" by Harry D. Anspon and Bert Clampitt, filed of even date, for a more detailed de- ption of the method of preparing the ion exchange lium employed in producing the stable aqueous ethyl- polymer dispersions of this invention.

he dispersed ethylene-alkyl acrylate polymers em- /ed in preparing the compositions of this invention be viewed generally as a polyethylene chain contain- units (a) and units (b) as hereinafter defined, and onally, one of the hereafter defined following units , units (d) and units (e):

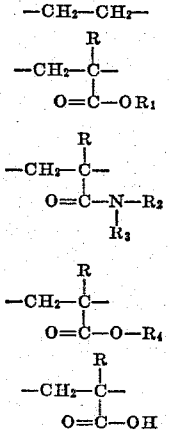

rein R is selected from the group consisting of hy- ;en and hydrocarbon groups, $R_1$ is a metallic cation, and $R_3$ are independently selected from the group isting of hydrogen, hydrocarbon groups and hydroxy- l groups, and $R_4$ is a hydrocarbon group. The mol :entration of the total of units (b), (c) and (d) is in range of 0.01 to 0.5 (preferably from about 0.025 to it 0.25) mol per mol of contained ethylene. Thus, ethylene-alkyl acrylate polymer introduced into the exchange zone as an aqueous dispersion is selected n the group consisting of:

1) Polymers containing 67–99 mol percent of units and, correspondingly, 33–1 mol percent of units (b),
2) Polymers containing 67–99 mol percent of units and, correspondingly, 33–1 mol percent of a mix- of units (b) and (c),
3) Polymers containing 67–99 mol percent of units and, correspondingly, 33–1 mol percent of a mixture nits (b) and (d),
4) Polymers containing 67–99 mol percent of units and, correspondingly, 33–1 mol percent of a mix- of units (b), (c), (d) and (e),
5) Polymers containing 67–99 mol percent of units and, correspondingly, 33–1 mol percent of a mix- of units (b), (d) and (e),
6) Polymers containing 67–99 mol percent of units and, correspondingly, 33–1 mol percent of a mix- of units (b), (c) and (d), and
7) Mixture of (1), (2), (3), (4), (5) and (6).

he product of the ion exchange process is a shelf- ıle aqueous dispersion of a water-insoluble, self- ılsifiable ethylene polymer selected from the groups sisting of:

(1) Polymers containing 67–99 (preferably 87–95.2) mol percent of units (a)' and, correspondingly, 33–1 (preferably 13.0–4.8) mol percent of units (b)', (2) Polymers containing 67–99 (preferably 87–95.2) mol percent of units (a)' and, correspondingly, 33–1 (preferably 13.0–4.8) mol percent of a mixture of units (b)' and (c)', (3) Polymers containing 67–99 (preferably 87–95.2) mol percent of units (a)' and, correspondingly, 33–1 (preferably 13.0–4.8) mol percent of a mixture of units (b)', (c)' and (d)', (4) Polymers containing 67–99 (preferably 87–95.2) mol percent of units (a)' and, correspondingly, 33–1 (preferably 13.0–4.8) mol percent of a mixture of units (b)' and (d)', and (5) Mixtures of (1), (2), (3) and (4), said units (a)' having the structure $$-CH_2-CH_2-$$

said units (b)' having the structure

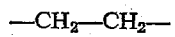
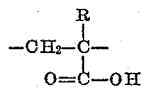

said units (c)' having the structure

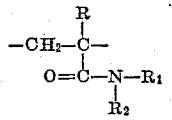

and said units (d)' having the structure

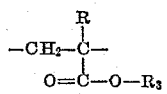

where R is selected from the group consisting of hy- drogen and hydrocarbon groups, $R_1$ and $R_2$ are inde- pendently selected from the groups consisting of hy- drogen, hydrocarbon groups and hydroxy-alkyl groups, and $R_3$ is a hydrocarbon group.

The product stable aqueous dispersions of this inven- tion can be employed in coating compositions, in the preparation of adhesives, and the like. The stable aqueous ethylene polymer dispersions are particularly useful in the preparation of glass laminated structures. The lami- nated glass structures can be prepared, for example, by laying down the aqueous dispersion of the ethylene poly- mer on one glass lamina, evaporating the water there- from, subsequently placing the coated glass lamina against a second glass lamina (which also may be coated with the ethylene polymer) and heating under at least light pressure.

The following examples are presented to illustrate the objects and advantages of the invention. However, it is not intended that the invention should be limited to the specific embodiments presented therein.

EXAMPLE I

In this example the effectiveness of the invention in the separation of alkali metals from aqueous disper- sions of ethylene-alkyl acrylate polymers wherein por- tions of the acrylate groups are in carboxylate salt, amide, acid and ester form is demonstrated. A 2¼" diameter glass column is filled to a height of 30 inches with 1500 grams of Dowex 50-W-X4 cationic exchange resin (marketed by J. T. Baker Chemical Company, Phillipsburg, N.J.) in particulate form with the size of the particles in the range of 50–100 mesh. The column is backwashed with distilled water to provide proper bed distribution and to separate any foreign material from the cationic exchange resin. 1500 grams of ammonium chloride as a saturated aqueous solution of ammonium chloride is passed through the column. The column is then washed with distilled water until analysis of the effluent shows no chloride ions to be present.

9500 ml. of an aqueous dispersion of an ethylene-alkyl acrylate polymer containing 12.5 weight percent normally solid polymer is passed through the column, from top to bottom, at a rate of 10 to 15 ml./minute. The ethylene-alkyl acrylate polymer composition comprises an ethylene-methyl acrylate polymer containing 20.0 weight percent methyl acrylate which has been subjected to a hydrolysis reaction so as to hydrolyze 50.0 mol percent of the acrylate groups to the sodium salt form, 35.0 mol percent of the acrylate groups to the amide form and 15.0 mol percent of the acrylate groups to the acid form. The pH of the aqueous dispersion of the ethylene polymer passed to the column is 10.2. The column is then backflushed with distilled water and recharged with ammonium chloride.

Analysis of the aqueous product dispersion withdrawn from the column shows that 65.0 mol percent of the acrylate groups are in acid form and 35.0 mol percent of the acrylate groups are in amide form. The sodium ion has been seperated by the ion exchange process from the aqueous dispersion of the ethylene polymer. The pH of the product aqueous dispersion is 8.4.

EXAMPLE II

In this example the effectiveness of the invention in the separtion of alkali metals from aqueous dispersions of ethylene-alkyl acrylate polymers wherein the acrylic groups are in potassium salt form is demonstrated. A 1⅛" diameter column is filled to a height of 30 inches with the Dowex 50-W-X4 cationic exchange resin of Example 1 in particulate form with the size of the particles in the range of 50–100 mesh. The column is backwashed with distilled water to provide proper bed distribution and to separate any foreign material from the ciationic exchange resin. 100 grams of ammonium chloride as a saturated aqueous solution is passed through the column. The column is then washed with distilled water until analysis of the effluent shows no chloride ions to be present.

3700 ml. of an aqueous dispersion of an ethylene-methyl acrylate polymer containing 7.4 wt. percent normally solid polymer is passed through the column, from top to bottom. The ethylene-methyl acrylate polymer composition comprises an ethylene-methyl acrylate polymer containing 20.0 wt. percent methyl acrylate which has been subjected to a hydrolysis reaction to produce a polymer wherein all of the acrylate groups are in potassium salt form. The pH of the aqueous dispersion of the ethylene polymer passed to the column is 12.0.

Analysis of the aqueous product dispersion withdrawn from the column shows that all of the acrylate groups are in acid form. The potassium ion has been separated from the aqueous dispersion by the ion exchange process step. The pH of the product aqueous dispersion is 9.6.

Although the invention has been described with reference to specific materials, embodiments and details, various modifications and changes, within the scope of this invention, will be apparent to one skilled in the art and are contemplated to be embraced in the invention.

What is claimed is:
1. In the process of separating metallic cations from an aqueous dispersion of a water-insoluble, self-emulsifiable ethylene polymer; the steps which comprise passing an aqueous dispersion of a water-insoluble self-emulsifiable ethylene polymer containing pendent metallic carboxylate groups through an ion exchange zone containing an ion exchange medium comprising a strongly acidic cation exchange resin charged with ammonium ions, said ethylene polymer selected from the group consisting of:
(1) Polymers containing 67–99 mol percent of units (a) and, correspondingly, 33–1 mol percent of units (b),
(2) Polymers containing 67–99 mol percent of units (a) and, correspondingly, 33–1 mol percent of a mixture of units (b) and (c),
(3) Polymers containing 67–99 mol percent of units (a) and, correspondingly, 33–1 mol percent of a mixture of units (b) and (d),
(4) Polymers containing 67–99 mol percent of units (a) and, correspondingly, 33–1 mol percent of a mixture of units (b), (c) and (d), and
(5) Mixtures of (1), (2), (3) and (4), said units (a) having the structure

said units (b) having the structure

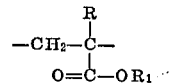

said units (c) having the structure

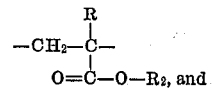

said units (d) having the structure

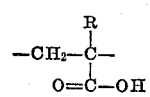

where R is selected from the group consisting of hydrogen and hydrocarbon groups, $R_1$ is a metallic cation, and $R_2$ is a hydrocarbon group,
exchanging the ammonium ion for the metallic cations in said ethylene polymer, and recovering from said ion exchange zone a stable aqueous dispersion of a water-insoluble, self-emulsifiable ethylene polymer substantially free of metallic cations.

2. The process of claim 1 wherein said ethylene polymer introduced into said ion exchange zone is selected from the group of polymers containing 67–99 mol percent of units (a) and, correspondingly, 33–1 mol percent of units (b).

3. The process of claim 1 wherein said metallic cations are alkali metal cations.

4. The process of claim 1 wherein said strongly acidic cation exchange resin is sulfonated polystyrene.

5. The process of claim 1 wherein R is hydrogen.

6. The process of claim 1 wherein the concentration of units (a) is in the range of 87–95.2 and, correspondingly, the concentration of the total of units (b), (c) and (d) is in the range of 13.0–4.8 mol percent of the total of units (a), (b), (c) and (d).

References Cited

UNITED STATES PATENTS 3,249,570  5/1966  Potts et al. _____ 260—29.6
3,337,488  8/1967  Lyons et al. _____ 260—29.6

FOREIGN PATENTS 1,307,187  9/1962  France.

MURRAY TILLMAN, Primary Examiner

H. ROBERTS, Assistant Examiner

U.S. Cl. X.R.

117—161; 161—703; 260—88.1, 86.7, 80.73, 80.8